March 13, 1928.

E. T. SMITH

VALVE OPERATING MECHANISM

Filed April 7, 1924 4 Sheets-Sheet 2

1,662,134

March 13, 1928.

E. T. SMITH 1,662,134

VALVE OPERATING MECHANISM

Filed April 7, 1924

Patented Mar. 13, 1928.

1,662,134

UNITED STATES PATENT OFFICE.

EMORY T. SMITH, OF LUDLOW, MASSACHUSETTS, ASSIGNOR TO THE CHAPMAN VALVE MANUFACTURING COMPANY, OF INDIAN ORCHARD, MASSACHUSETTS, A CORPORATION OF MASSACHUSETTS.

VALVE-OPERATING MECHANISM.

Application filed April 7, 1924. Serial No. 704,738.

This invention relates to power transmission means, and more particularly to an improved means for operating valves, and the like.

While this invention is particularly adapted for use in operating valves and other devices to which a limited movement is to be given, and, as a matter of convenience in illustration, is shown as embodied in a structure for operating a valve, it will be understood that it has a wide field of utility for other purposes.

Among the more important objects and features of this invention are: the embodiment in a unit structure of means for operating various types, arrangements and sizes of valves and other mechanisms; the embodiment in a structure of means whereby the valve, or the like, may be operated manually or by other power; the arrangement of the manual and power actuated driving means wherein a motor, limit control means therefor, and manual means are all embodied in a structure which is compact, possesses strength and rigidity, and as a complete power transmission unit may be associated with any one of various types of valves, whether rotary or reciprocable without material modification of the valve or other structure; the complete housing of the power transmission mechanism to protect the same against damage and the operator against injury; the facility with which the various parts of the device may be reached for repair or replacement; the embodiment in a device of this character of an arrangement whereby assembly and dissembly of the parts may be quickly and facilely accomplished; and the novel means for operatively connecting the motor and transmission mechanism or for disconnecting the same, and for indicating the condition of such connection whereby the valve or other device may be manually operated when necessary or desirable independently of the motor and its associated driving elements.

Additional objects and features of utility and improvement reside in the particular embodiment illustrated and are: the mounting of the motor externally of the other parts of the device yet upon the support for the same whereby the motor, while not destroying the unity of the structure, is rendered readily accessible for repair or removal in order to reduce to a minimum the period of retirement of the valve or other device from service when repairs are required; the generally dust-proof casing for the power transmission means and associated parts; the simplicity of the control for effecting connection and disconnection of the motor to the transmission means; and the generally new functions performed by the device developing from the improved form of lost motion connection between the transmission mechanism and the driven element whereby the motor is permitted to get up to speed before having the load placed thereon.

This invention is further and more particularly characterized by provision of an improved compact and simplified gearing for operating valves, and the like, permitting of reduction in the size of the device to that which will occupy a small space, and wherein the employment of small universal current electric motors is facilitated; the provision of improved gearing and means for manipulating the same; the provision of improved "irreversible" gearing, that is, gearing which will permit of operation in either direction by the motor but which is not operable in a direction from the element to be driven against the motor, and thereby forms a locking means; and the provision of improved means for manually operating the various parts of the device.

The foregoing, as well as such further objects and additional benefits and advantages as may hereinafter appear or be pointed out, I attain by means of a construction, one embodiment of which is illustrated in the accompanying drawings wherein.

Figure 1:
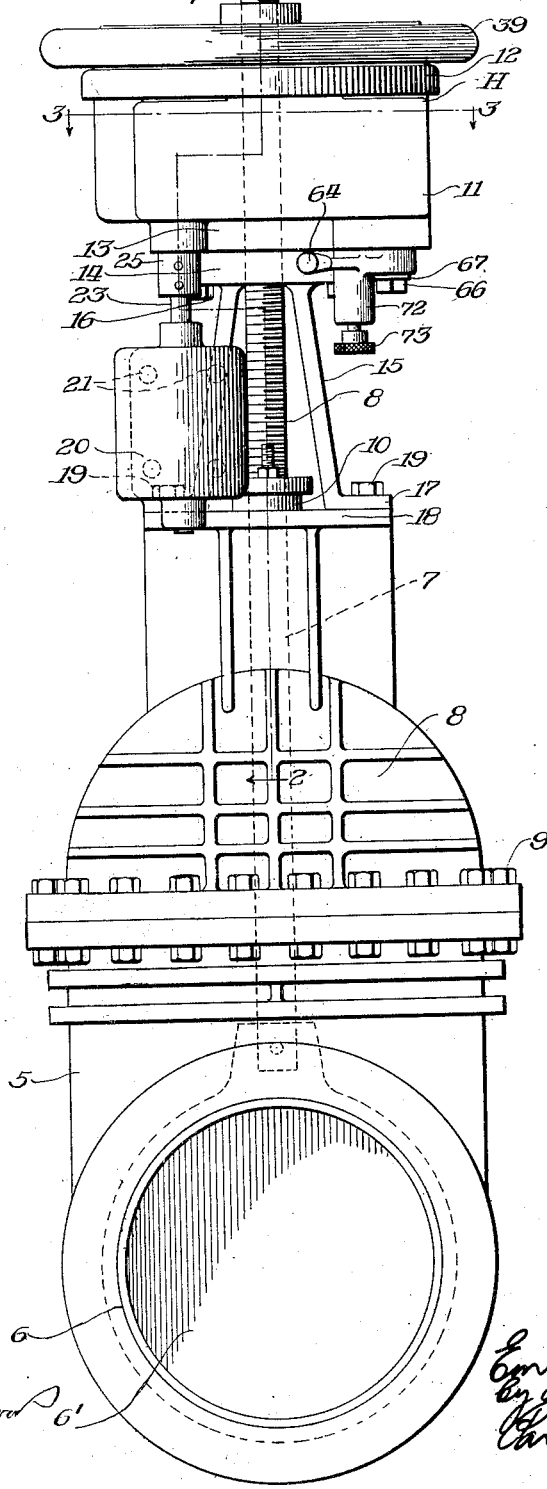
Figure 1 is a side elevational view of a valve embodying the improvements of this invention.
Figure 2:
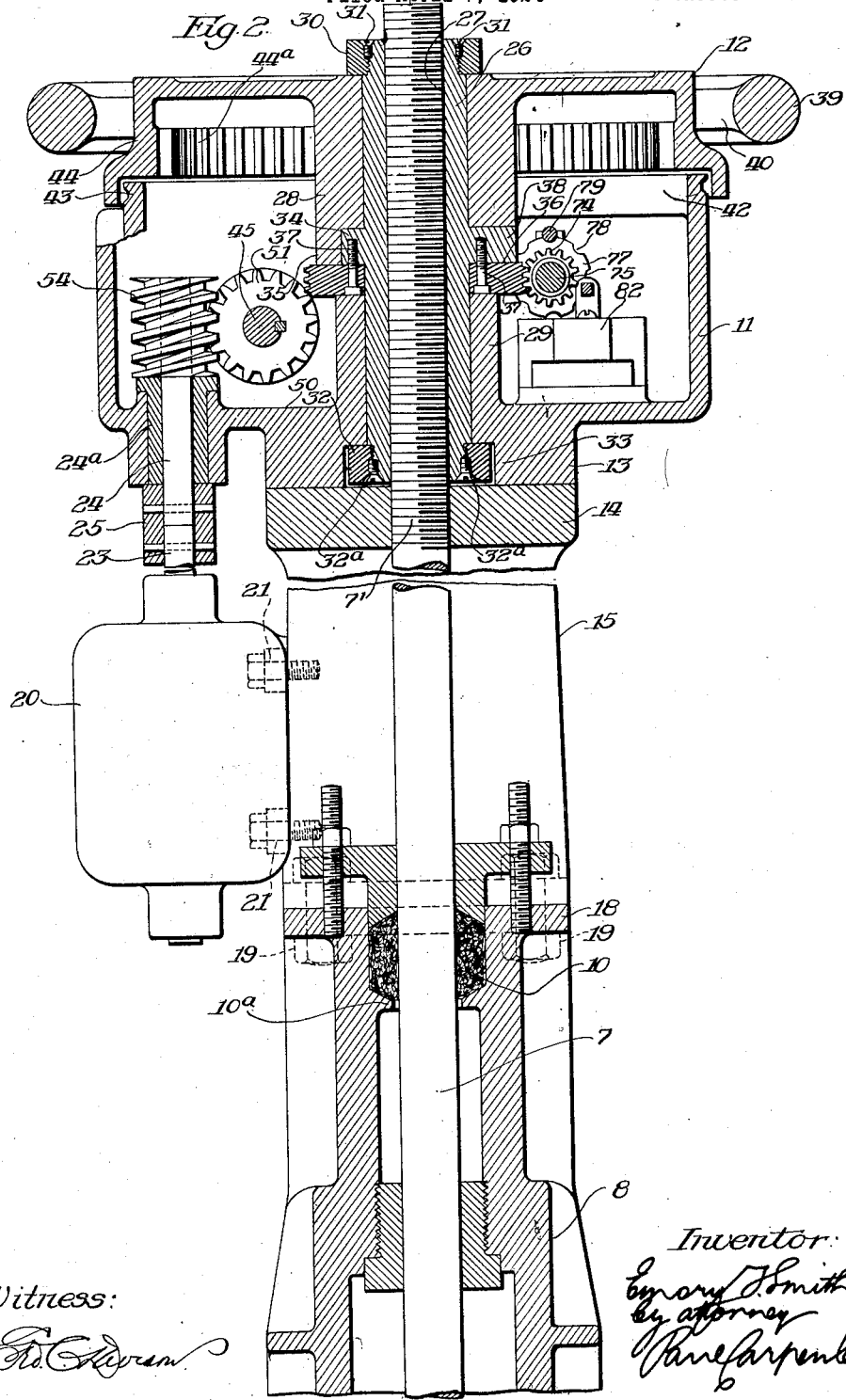
Figure 2 is a fragmentary enlarged vertical sectional view taken on the line 2—2 of Figure 1, looking in the direction indicated by the arrows.

Referring now in detail to the drawings, wherein this invention is embodied in a structure particularly adapted for operating valves, and is shown as applied to a valve of the well known gate type, 5 is the valve casing, this casing having the usual port 6 across which is slidable the blade of the valve 6', this valve being carried on one end of an operating member, such as a valve stem 7, which extends upwardly through the center of the valve casing 5 into and through the top of the detachable head 8 secured to the casing 5 by the bolts 9. The valve stem 7 extends through a fluid tight packing gasket 10 mounted on the top of the head 8 on an annular integral flange 10ª and is provided with a threaded portion 7' beyond the head 8.

The structure so far described is that usually embodied in any sliding gate valve, and, as previously pointed out, one of the objects of the invention is to mount the valve operating device as a unit upon the valve casing and to afford means for opening and closing the valve, either manually or by means of a motor. To this end the structure to be described hereinafter has been designed.

As shown generally in Figure 1, the invention includes a housing H composed of the lower portion 11 and the upper portion 12, which housing contains the power transmission gearing and means for controlling the same. The lower portion 11 is provided with a depending substantially circular enlargement 13 which seats upon a similarly formed head 14 carried by the standard which comprises the flanged divergent legs 15, only one of which is shown.

Bolts 16—16 extend through the head 14 into suitably threaded recesses in the bottom face of the enlargement 13, thus fixedly mounting the housing upon the legs 15. The legs 15 are provided with foot portions 17 which are of suitable breadth to engage evenly the upper surface of the platform 18 usually cast integrally with the head 8, suitable bolts 19—19 extending through the foot portion 17 into the platform 18 for fixedly connecting the standard comprising the legs to the valve casing. Thus the housing for the transmission gearing, to be presently described, is rigidly disposed on the valve casing.

The power operating means for the device of this invention is preferably an electric motor 20, the casing of which is provided with feet 21—21 for securement to lugs formed in complemental pairs on the legs 15 so as to support the motor directly upon the legs about midway of the length of the same. The motor shaft 23 extends parallel to the valve stem 7, but to one side of the enlargement 13, said shaft 23 being connected to a shaft 24, which extends from the portion 11 of the housing, by means of a sleeve 25. Of course, any other suitable means may be provided for connecting the shafts 23 and 24.

Transmission gearing is contained in the housing H composed of the sections 11 and 12, the former section being fixedly mounted on the standard and the latter being rotatable and connected operatively with the threaded part 7' of the valve stem through a lost motion connection for imparting rectilinear movement thereto within certain limits. The connection between section 12 of the housing and the threaded part of the stem preferably includes a sleeve 26 provided with an internally threaded bore 27 which engages the valve stem, the sleeve being separate from and rotatably mounted in a vertically extending axial hub 28, preferably cast integrally with the top section 12 of the housing. Thus the sleeve 26 is rotatable relative to the hub 28 through certain limits governed by the lost motion arrangement to be presently described.

The bottom portion 11 of the housing is provided with an upstanding axial hub 29 which extends to a point about midway of the sleeve 26, but in spaced relation to the lower end of the hub 28. The sleeve is freely rotatably mounted in the hub 29 and is retained against longitudinal movement in either of the hubs 28 and 29 by means of a collar 30 which encircles the upper projecting end of the sleeve and is secured thereto by key screws 31, and a second collar 32 which is threaded to the lower end of the sleeve and lies in an annular recess 33 formed in the base of the portion 11. Screws 32ª—32ª lock the collar 32.

Between the adjacent ends of the hubs 28 and 29 a laterally extending annular flange 34 is provided, having a segmental lug 35 formed integrally therewith and with the sleeve 26. A worm 36 is secured to the flange 34 by means of screws 37, said worm lying between the upper end of the hub 29 and said flage 34, and performing a function which will presently appear. The lower end of the hub 28 is provided with a segmental lug 38, shown in dotted lines in Figure 3, and arranged in the plane of the lug 35, these lugs or abutments being adapted to engage, when motion is imparted to the upper section 12 of the housing, either manually or by the power transmission gearing from the motor as will appear presently.

To the end that the necessary rotary motion may be manually imparted to the upper section 12 of the housing, the latter is provided with a hand wheel 39 integrally cast with the upper section 12 through the medium of webs 40.

It will be observed that while the lower section 11 of the housing is somewhat irregular in shape for purposes which will later appear, the lower section has an opening 42 defined by an annular upstanding flange 43 which enters the upper section 12 and with the annular wall 44 thereof, affords a substantially dust-proof joint.

The wall 44 is provided with an internal ring gear 44ª here shown as integrally formed with the wall 44, and the motor is disconnectably connected with said ring gear by the provision of gearing which I shall now proceed to describe.

The transmission gearing comprises a horizontal countershaft 45, rotatably mounted in a bearing 46, which latter is carried by a sleeve 47 having ears 48 for reception of bolts 49 whereby said bearing sleeve may be detachably secured to the floor 50 of the section 11.

A worm gear 51 is keyed to one of the projecting ends of the shaft 45, and a worm 52 is keyed to the opposite end thereof, the worm gear and worm abutting the ends of said sleeve and nuts 53—53 on the ends of the shaft cooperating to prevent endwise movement of the latter.

The shaft 24 extends into the housing through a bearing 24ª and carries a worm 54 which meshes permanently with the worm gear 51, so that the motor will drive the shaft 45.

The worm 52 meshes with a worm gear 55 conveniently formed as shown on the lower end of a revoluble sleeve 56, said sleeve being mounted for rotation on a bearing 57 surrounding a shaft 58, the bearing 57 having a flange 59 abutting the upper end of the bearing 60 in the floor 50. The sleeve 56 rests upon said flange, and the bearing 57 and sleeve 56 are retained against upward displacement by the provision of a washer 61 secured in position by the bolt 62.

The upper end of the sleeve 56 is provided with gear teeth affording a pinion 63, which is adapted to mesh with the ring gear teeth 44ª.

The shaft 58 is provided with an enlarged eccentric portion 58ª lying within the bearing 60 and an extension 58ᵇ for connection with a lever 64, which latter is arranged externally of the housing and serves to rotate the shaft 58 for a purpose which will presently appear. The lever lies against the enlarged portion 65 and is retained in position by the provision of a nut 66 and washer 67, the latter elements serving to cooperate with the bolt 62 for maintaining the lever 64, shaft 58, sleeve 57 and associated elements assembled.

Figure 6:
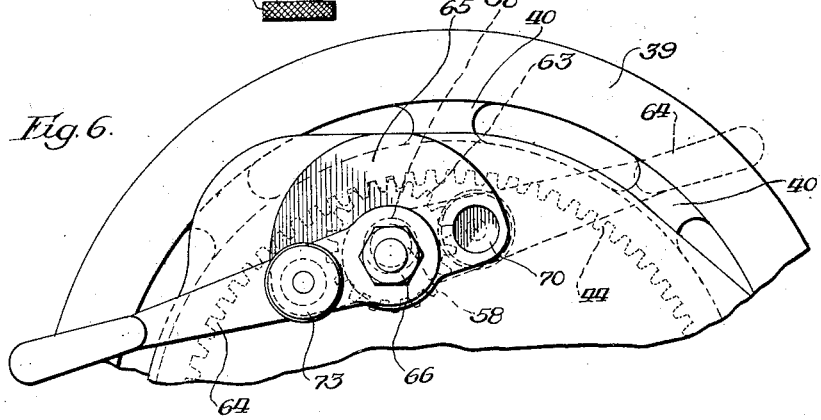
Figure 6 is a fragmentary bottom plan view.

When the lever 64 is moved from the position shown in Figure 6 to the dotted line position, the eccentric portion 58ª of the shaft 58 displaces the pinion 63 laterally out of engagement with the gear 44ª, so as to disconnect the motor 20 from the rotatable section 12 of the housing, and thus permit of manual operation.

The lever 64 is locked in its different positions by the provision of a plunger 68 which enters one or the other of the recesses 69 and 70 in the portion 65 under the tension of the helical spring 71 mounted in a pocket 72 in said lever. A knob 73 serves to withdraw the plunger 68 when desired.

Figure 3:
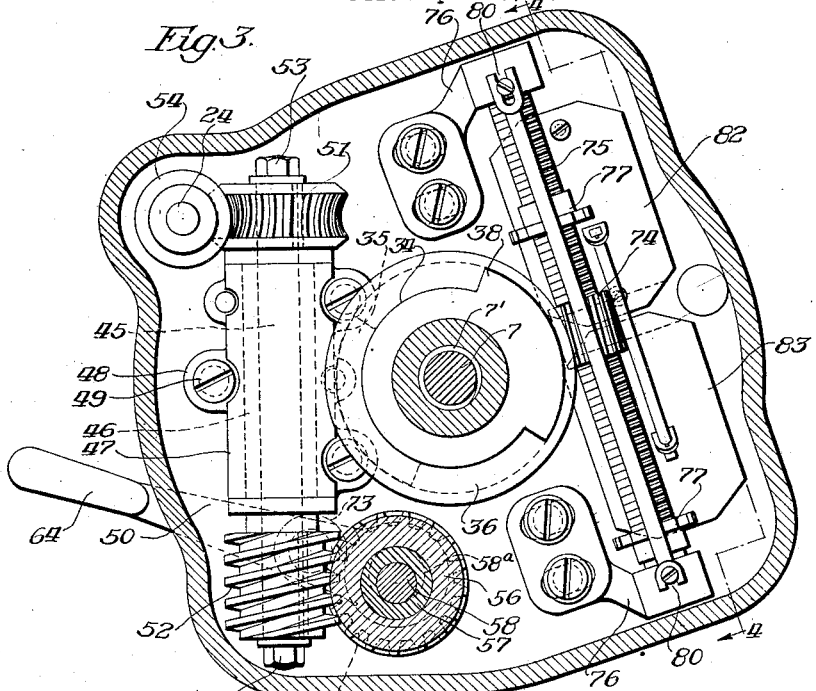
Figure 3 is an enlarged transverse horizontal sectional view taken on the line 3—3 of Figure 1, looking in the direction indicated by the arrows.
Figure 4:
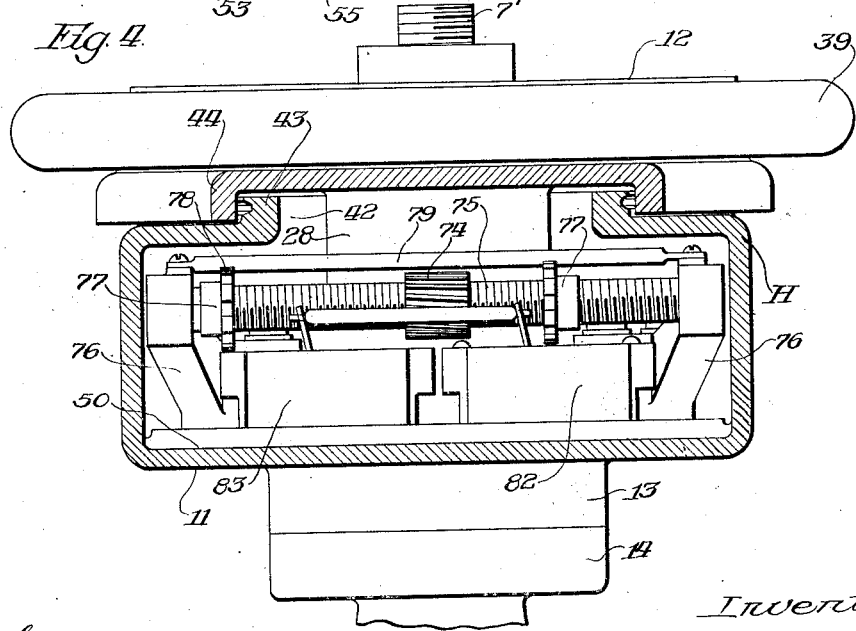
Figure 4 is an enlarged transverse vertical sectional view taken on the line 4—4 of Figure 3, looking in the direction indicated by the arrows.
Figure 5:
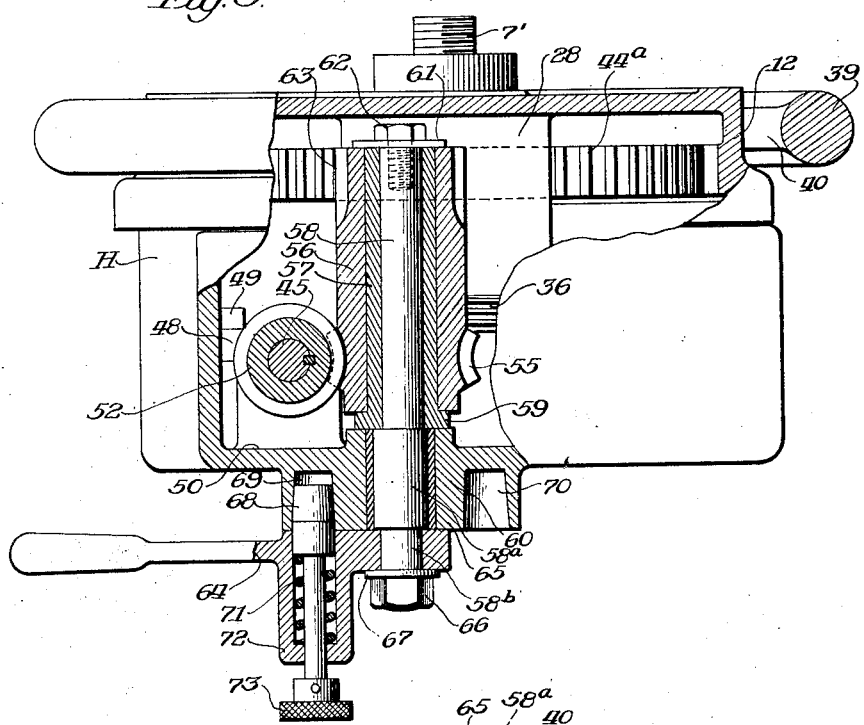
Figure 5 is an enlarged fragmentary view of the device similar to Figure 1, a part of the casing being broken away and certain parts shown in vertical section.

It will be observed that when the device is motor operated the worm and worm gear drive serve to eliminate noise in operation and also serve to lock the mechanism after an operation, or at any point at which the valve may be stopped. Manual operation of the valve may be readily accomplished, and due to the compact construction the motor may be brought more nearly directly under the housing H, this being an important advantage where space is limited. With this idea of economy in space in mind, the lower section 11 of the housing is made to confine itself more nearly within the confines of the upper section, though accommodations for the various elements, such as worms 52 and 54, and the time switch to be described are afforded by the shape of the lower section 11 as seen in Figure 3. These advantages will become more readily apparent in comparison with a structure such as that illustrated in my co-pending application Serial No. 541,620, filed March 6, 1922. The movement of the shaft 58 is such that while the pinion 63 is disconnected from the ring gear 44ª, the worm gear 55 always has driving engagement with the worm 52.

I provide means for controlling the motor circuit within certain limits, this means being operated by the worm 36 and comprising a worm gear 74 in meshing engagement with the worm and mounted upon the medial portion of the screw-rod 75 and rotatable therewith, which rod is mounted at its ends in bearings 76—76 carried by the base of the housing section 11. A pair of nut stops 77 are mounted upon and in threaded engagement with the rod 75, these nuts having each a plurality of notches 78 for receiving the guide-rod 79, this guide-rod preventing turning of said nuts and extending above and parallel with the screw-rod 75 and having at its ends recesses 80—80 engaging screws 81—81 in the upper faces of bearings 76—76.

Two switches 82 and 83 are mounted on the floor 50 of the section 11, and the levers 84 and 85 of said switches are arranged in the path of the movement of the nuts 77, said levers being connected by a link 86 so that both switches are simultaneously operated by either of the nuts 77, so that, depending upon the positions of said nuts on the rod 75, the motor circuit will be interrupted at the proper time, and the motor connections reversed similarly to the arrangement described in my copending application herein referred to.

Having thus described my invention and illustrated its use, what I claim as new and desire to secure by Letters Patent is:

1. In a device of the character described, in combination, a casing, an element to be driven and including the movable part of said casing, a motor, driving gearing completely enclosed in said casing and including a worm connected to the motor, a worm gear and spur gear connected to the element to be driven, and means for displacing said worm gear and spur gear for disconnecting the motor from the movable part of said housing.

2. In a device of the character described, in combination, an element to be driven and including the movable part of a casing, a motor, driving gearing encompassed by said movable part including a worm driven by the motor and a spur gear operated by the worm for operatively connecting said motor and element to be driven, and manually operated means for driving said first mentioned element.

3. In a device of the character described, in combination, a casing comprising a relatively stationary element and a rotatable element, a ring gear on said rotatable element, a motor, and means between said motor and ring gear for connecting the two and including a worm driven by the motor and a spur gear operated by the worm, and a laterally displaceable shaft for one of said last mentioned elements for disconnectably connecting same to said ring gear.

4. In gearing of the character described, the combination with a casing, a part of which is revoluble, and a motor adjacent to said casing, of a worm within said casing operatively driven by said motor, and a worm gear driven by the worm, and a pinion displaceable in said casing operatively connected to the movable part thereof and to said worm gear.

5. In a gearing of the character described, the combination with a casing, a part of which is revoluble, and a motor adjacent to said casing, of a worm within said casing operatively driven by said motor, a worm gear in said casing connected to said worm, and a laterally displaceable pinion driven by said worm gear and arranged in said casing and forming a disconnectable connection with the movable part thereof.

6. In gearing of the character described, the combination with a casing, a part of which is revoluble, and a motor adjacent to said casing, of a worm within said casing operatively driven by said motor, and a displaceable gear in said casing so connected as to be operatively actuated by said worm and operatively disconnectably connected to the movable part thereof.

7. In gearing of the character described, the combination with a casing, a part of which is revoluble, and a motor adjacent to said casing, of a worm within said casing operatively driven by said motor, and a gear driven by said worm and disconnectably operatively connected to the movable part of said casing.

8. In gearing of the character described, the combination with a casing, a part of which is revoluble, and a motor adjacent to said casing, of a worm within said casing operatively driven by said motor, and a worm gear driven by said worm and a pinion actuated thereby and disconnectably operatively connected to the movable part of said casing, and means for displacing said pinion.

9. In gearing of the character described, the combination with a casing, a part of which is revoluble, and a motor adjacent to said casing, of a worm within said casing operatively driven by said motor, a worm gear and pinion operatively arranged between the worm and said casing, and means for laterally displacing said pinion.

10. In gearing of the character described, the combination with a casing, a part of which is revoluble, and a motor adjacent to said casing, of a worm within said casing operatively driven by said motor, a worm gear and pinion actuated thereby and operatively arranged between the worm and said casing, and means for displacing said pinion for connecting and disconnecting same from said casing.

11. In gearing of the character described, the combination with a casing, a part of which is revoluble, and a motor adjacent to said casing, of a worm within said casing operatively driven by said motor, a worm gear and pinion actuated thereby and operatively arranged between the motor and said casing, and an eccentric member for laterally displacing said pinion.

12. In a gearing, the combination with a motor and an element to be driven, of a worm and a worm gear operatively connected to said motor, a pinion associated with said worm gear and actuated thereby, and an eccentric shaft for supporting said worm and pinion.

13. In a gearing, the combination with a motor and an element to be driven, of a worm gear operatively driven by said motor, a pinion actuated by said worm, and eccentrically displaceable means for supporting said worm gear and pinion for connection to the motor and element to be driven, respectively.

14. In gearing of the character described, the combination with a casing, a part of which is revoluble, and a motor adjacent to said casing, of a worm within said casing operatively driven by said motor, a worm gear and a spur gear actuated thereby and operatively arranged between the motor and said casing, and an eccentric member for laterally displacing said spur gear and worm gear without disconnection of the latter from said motor.

15. In a gearing of the character described, an element to be driven, means for actuating said element including a counter shaft having a worm thereon, a pedestal arranged in a plane angularly related to the axis of said shaft, a worm gear meshing with said worm and revoluble on said pedestal, a pinion engaging the element to be moved operable with and on the same axis as that of said worm gear, and means for bodily laterally displacing said pedestal for operatively connecting and disconnecting said pinion with respect to said element to be driven but without disconnecting said worm and worm gear.

16. In a gearing of the character described, an element to be driven, means for actuating said element including a counter shaft having a worm thereon, a pedestal arranged in a plane angularly related to the axis of said shaft, a worm gear meshing with said worm and revoluble on said pedestal, a pinion engaging the element to be moved operable with and on the same axis as that of said worm gear, and means for imparting rotation to said pedestal and thereby bodily laterally displacing said pedestal for operatively connecting and disconnecting said pinion with respect to said element to be driven but without disconnecting said worm and worm gear.

In testimony whereof I have hereunto placed my signature.

EMORY T. SMITH.